March 19, 1957 J. O. PAIVINEN 2,786,137

PULSE STANDARDIZER CIRCUIT

Filed Oct. 21, 1952

INVENTOR
JOHN O. PAIVINEN
BY
Laurence R. Brown
ATTORNEY

United States Patent Office 2,786,137
Patented Mar. 19, 1957

2,786,137

PULSE STANDARDIZER CIRCUIT

John Oliver Paivinen, Aldan, Pa., assignor to Burroughs Corporation, Detroit, Mich., a corporation of Michigan Application October 21, 1952, Serial No. 315,924

5 Claims. (Cl. 250—27)

This invention relates to electronic circuits for generating standardized pulse waveforms and more particularly it relates to apparatus for producing pulses of standard pulse length and shape in response to trigger pulses of random pulse lengths and shapes.

Many electronic circuits prefer input pulses of substantially constant duration and constant amplitude to insure proper operation under all conditions. Rectangular pulses having a constant width with precisely defined leading and trailing edges are preferable. However, triggering pulses obtained from electronic circuits not equipped for pulse shaping may have either random width or varying amplitude characteristics. Accordingly, it is desirable to provide suitable pulse shaping circuits for obtaining standardized trigger circuit output pulses. Circuits, however, must not be too complex in nature or be subject to variations of output amplitude or pulse width caused in response to variations in input trigger pulses.

Operation with a feedback or oscillation principle may result in a variation of pulse characteristics with aging of tubes or components and changing potentials. Such circuits are also generally not highly successful in providing a uniform flat top response in the output pulses. Circuit efficiency is important in many installations and accordingly amplifier tubes associated with pulse standardizer circuits are preferably caused to be in a normally non-conducting state. This also increases tube life and reliability.

It is, accordingly, a general object of the invention to provide improved pulse standardizing circuits.

It is another object of the invention to provide standard pulses with a constant output pulse length and a flat top response.

Another object of the invention is to provide pulse standardizer circuits which utilize little power and which are not materially affected by aging of circuit components and the like.

A further object of the invention is to provide constant width rectangular pulses in which both the leading and trailing edges of the impulses are defined with high accuracy.

In accordance with the present invention, there is, therefore, provided an electronic pulse standardizing circuit in which the input trigger pulses are utilized for triggering a pulse forming circuit and initiating conduction of a normally non-conducting amplifier. The pulse forming circuit, therefore, provides a highly accurate pulse which is utilized to maintain conduction of the amplifier and provide an output pulse having the desired characteristics. To prevent any influence on the output waveform by the input trigger pulse, a lockout circuit is provided for decoupling the input trigger pulse from the amplifier after conduction is initiated. In this manner, the amplitude and both the edges of the pulses are established independently of any input pulse characteristics.

Further objects and features of advantage of the present invention will be found throughout the following detailed description of the invention and its mode of operation. The invention may be more fully understood when the description is read in connection with the accompanying drawings wherein like circuit elements are designated with similar reference characters to facilitate comparison of the respective figures, and in which.

Figure 1:
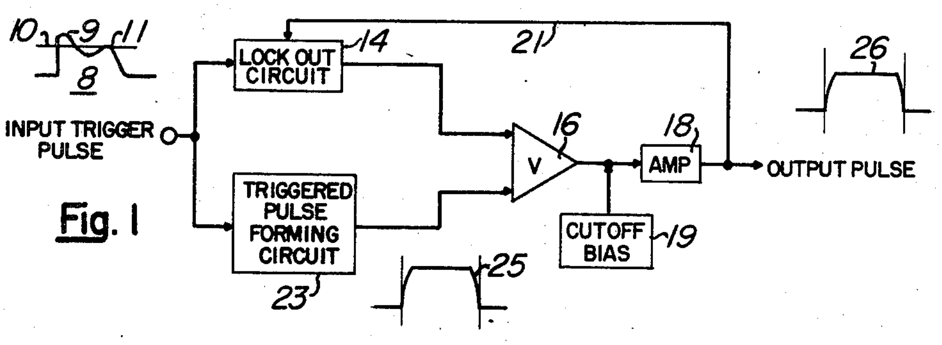
Fig. 1 is a block diagram of a circuit embodying the invention.

Referring now more specifically to Fig. 1, there is shown an input trigger pulse 8 which has a portion 9 thereof which exceeds a triggering potential level 10. As long as a portion of the pulse exceeds the triggering threshold potential level 10, the shape of the input waveform is not important and even a second excursion 11 above the triggering level 10 is ineffective in changing the characteristics of the output waveform when utilizing the principles of the invention.

The trigger pulse is translated by way of a lockout circuit 14 and a logical "or" V gate circuit 16 to the input terminal of amplifier 18, which is normally held in a non-conductive position by the cutoff bias source 19 which determines the threshold level. When the trigger pulse 8 initially exceeds the threshold potential level 10, the amplifier 18 conducts. A feedback circuit is connected by way of lead 21 to the lockout circuit 14 to thereafter decouple the input trigger pulse from the amplifier circuit 18 so that any further output of the amplifier circuit is entirely independent of the input pulse characteristics.

To maintain conduction of the amplifier circuit 18, and establish thereby a standard output pulse waveform, the input trigger pulse is also utilized to trigger the pulse forming circuit 23 thereby causing the standardized input waveform 25 for amplifier 18 to be generated. This waveform is coupled to the amplifier 18 by the "or" circuit 16 so that it maintains conduction of the amplifier circuit for the duration of the standardized waveform to thereby provide a standard output pulse 26.

Figures 2, 3:
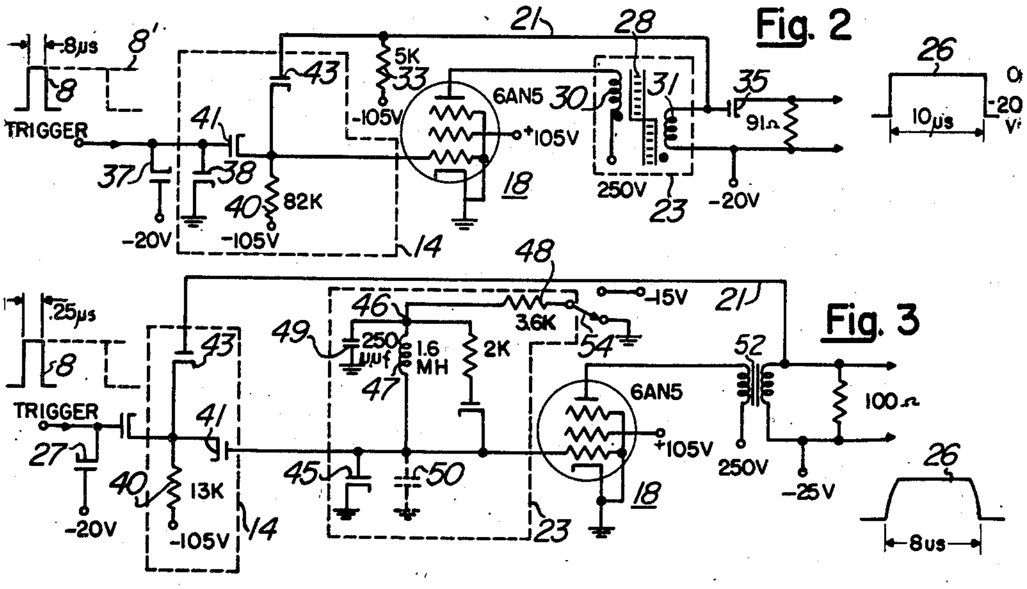
Fig. 2 is a schematic circuit diagram of apparatus embodying the invention.
Fig. 3 is a schematic circuit diagram of a further embodiment of the invention.

One circuit embodiment for effecting operation in accordance with the principles hereinbefore described is that of Fig. 2. In this embodiment the means for newly forming an independent pulse of predetermined characteristics is the transformer of the pulse forming circuit 23 connected in the output circuit of the amplifier 18. This transformer is constructed with a core 28 of magnetic material having rectangular hysteresis characteristics such as the commercially available product sold under the trade name "Deltamax" by the Allegheny Ludlum Steel Corporation. The core is shown to illustrate its propensity for remaining in one of two remanence polarities in response to applied saturating flux, which in this case may be provided in one polarity by current from the amplifier 18 flowing through the primary winding 30 of the transformer. The described magnetic materials have the property that the time required for saturation is fixed when a given voltage is applied to a given transformer. Also during the time that the flux changes within the core the impedance presented is essentially resistive so that no energy storage occurs within the material as normally found with magnetic materials having non-rectangular hysteresis loop. This is important in providing a substantially rectangular output waveform of constant amplitude throughout its width.

Circuits utilizing such transformers may be designed to provide pulses having a widely variable pulse width.

The circuit described in Fig. 2 is designed to provide a 10 microsecond pulse width with the values shown when an input trigger pulse of 0.8 of a microsecond or longer is applied. The transformer in this case has a core with 30 wraps of 0.7 mil Deltamax with a minimum diameter of 9/16". The primary has 400 turns and the secondary 50 turns. The input and output pulses both are of 20 volts amplitude in this embodiment and the output pulse provided will be substantially unchanged even when an input pulse is made longer than 10 microseconds as indicated by the dotted input waveform 8'.

Because of the remanence and saturation characteristics of the core 28, a second output pulse can not be provided until the core is reset by a suitable biasing source. Thus, current flow through the secondary winding 31 is established to provide a flux opposite to that set up in the primary winding. The current flows through winding 31 and the —20 volt terminal by way of a resistor 33 connected to a suitable current source such as the shown —105 volt biasing potential terminal. Thus, after the output pulse is removed, a small amount of current normally flows to restore the core 28 in condition for providing a further output pulse in response to a succeeding trigger pulse 8.

A unidirectional device such as diode 35 is provided in the output circuit to prevent current flow from the biasing potential source from flowing in the output load, and to block from the output circuit any pulses generated in the core 28 in response to the biasing potential which changes the core from remanence of one polarity to the other.

Input trigger pulses are clamped between the limits of —20 volts and ground by the respective diode clamp circuits 37 and 38. Cutoff bias at the —20 volt clamping level is normally maintained on the amplifier tube 18 in absence of any trigger pulses by means of the —105 volt source connected to input resistor 40, which permits current to flow through clamping diode 37. A positive input trigger pulse will serve to raise the grid circuit of the amplifier tube to ground potential established by clamping diode 38 and thereby cause conduction. Feedback potential is coupled from the output circuit through lead 21 and diode 43 to maintain the grid at the ground conduction level for the duration of the output pulse.

The grid is maintained at substantially ground potential during this feedback condition or by choice of component values in the feedback circuit. After the end of the trigger pulse, therefore, the lockout diode 41 is maintained at cutoff during the feedback period since the cathode is held at ground potential and the clamp 38 prevents the anode from rising above ground.

It is thereby assured that the trigger pulse is decoupled from the amplifier tube as soon as it has started conduction. Accordingly, the output waveform is dependent entirely upon the waveform characteristics of the pulse forming circuit 23 and can not be effected by vagaries occurring in the trigger pulse. Accordingly, the lockout circuit 14 provides improved operation in accordance with the teachings of the present invention.

The output pulse duration, as aforementioned, is determined by the time required for the transformer core 28 to saturate and therefore it is desirable to apply a fixed voltage to the input winding 30 from the amplifier 18. This may be accomplished by proper circuit design such as by operating the anode of the pentode 2 below the knee of its characteristic, or by clamping the secondary or primary circuits of the transformer 28 with additional diodes to limit the voltage to a particular value.

When a trigger pulse 8' of duration longer than the output pulse occurs the lockout diode 41 is caused by the trigger pulse to conduct after the output pulse expires to maintain the grid of tube 18 at the ground clamping potential and assure conduction of the amplifier to maintain the saturated condition of the transformer core 28 until the trigger pulse expires. Accordingly, a single output pulse is provided even in the presence of a trigger pulse of greater duration than the saturation time of transformer core 28.

Fig. 3 illustrates another embodiment of the invention in which a different type of pulse forming circuit 23 is connected in the input circuit of the amplifier 18 rather than the output circuit. In this case, the pulse forming network comprises a series inductor 47 and resistor 48 through which current flows by way of the —105 volt bias source and input resistor 40, during the normally cutoff condition of the amplifier tube 18 and has parameters chosen to provide pulses of sufficient amplitude to maintain the tube 18 in a blocked condition by the voltage drop across resistor 48, since the inductor 47 is of low impedance as compared with resistor 48. A charge therefore collects on capacitor 49 which does not immediately leak off after the bias source is decoupled by a trigger pulse blocking lockout diode 41 but maintains the potential at terminal 46 substantially constant, and for this reason the capacitor 49 is preferably large as compared with the stray capacity 50. Because of the lockout diode 41 and the impedance of inductor 47 the grid has its cutoff potential removed and attempts to assume ground potential because of the collapsing field in inductor 47. The leading edge of the output pulse therefore has a slope determined by the value of the inductor 47. As the grid potential reaches ground it is clamped by the diode 45 and current flows through the diode 45 and inductor 47 until the field about inductor 47 collapses. This action maintains a flat topped waveform throughout its duration.

The leading edge output pulse characteristic is therefore determined by the inductor 47, the shunting or wiring capacities 50, and the current flow established by the decaying flux of the inductor 47. Likewise the trailing edge of the output pulse will be determined by the same parameters when the current caused by the collapsing field fails to maintain the grid at ground potential by discharge of diode 45. Accordingly, both the leading and trailing edges of the output pulse waveform are accurately defined entirely independently of the input trigger pulse in this embodiment, as in the aforedescribed embodiments. Output pulses are coupled from the amplifier tube 18 to the output circuit by a pulse transformer 52 in this circuit although other output networks might be used, if desired.

Operation of the lockout circuit components 21, 43 is essentially the same as that of Fig. 2. Accordingly, an input trigger pulse will raise the cathode of diode 41 equal to or above the anode potential to thereby decouple the input trigger pulse from the pulse forming circuit. The lockout circuit maintains this decoupled condition until the completion of the output pulse.

In both this embodiment and that of Fig. 2, a variable pulse length may be easily obtained if desired. The circuit components of the network 23 of Fig. 3 may be made variable, and the potential applied to the amplifier tube 18 of Fig. 2 may be made variable. In the latter case it would probably be preferable to also vary the parameters of the lockout circuit simultaneously with the amplifier voltage so that proper lockout action is effective for all output pulse widths.

It is noted that a switch 54 is provided connecting the pulse forming network 23 to some arbitrary level designated as ground potential in the position shown. When the field about inductor 47 collapses to define the trailing edge of the output pulse and return amplifier 18 to cutoff the capacitor 49 tends to discharge to ground potential. Thus, the tube 18 will not be maintained in cutoff condition indefinitely at the expiration of the input trigger pulse and this limits the duration of the input trigger pulse.

For operating conditions where the trigger pulse may be longer than the output pulse, the alternative connection to the −15 volt supply terminal will assure cutoff of the amplifier tube 18 after the duration of the output pulse even though the trailing edge portion of the trigger pulse may still be applied at the input circuit after discharge of capacitor 49. It is to be recognized, that the voltages and circuit parameters given are by way of example to enable those skilled in the art to construct a specific circuit exemplifying the invention, but the description of the invention will suggest variations which do not depart from the spirit or scope of the invention. In this case, for example, the −15 volt connection at the switch 54 is less than the −20 volt clamping level connected to diode 27 so that the input trigger pulse must fall below 5 volts in order to enable the current to flow from the −105 volts applied through resistor 40, diode 41, and into the pulse forming network to restore the condition necessary for a further output pulse.

The output time T of the pulse is determined generally by the relationship $$T=\frac{LI_0}{E_0}$$

where L is the inductance of element 47, $I_0$ is the current in inductor 47 in absence of a trigger pulse, and $E_0$ is the magnitude of the input pulse. Since the current $I_0$ is established by the difference of potential and resistance in the circuit, it may be expressed by the relationship $$I_0=\frac{E_1+E_0}{R}$$

where R is the resistance of element 48, and $E_1$ is the potential at the switch arm 54. Therefore $$T=\frac{L}{E_0}\times\frac{E_1+E_0}{R}$$

Accordingly, when the potential $E_1$ is ground the time is independent of any potential variations and the circuit becomes extremely reliable in operation. Only variations of the inductor 47 or resistor 48 therefore can affect the output pulse duration after the circuit is triggered.

Figures 4, 5:
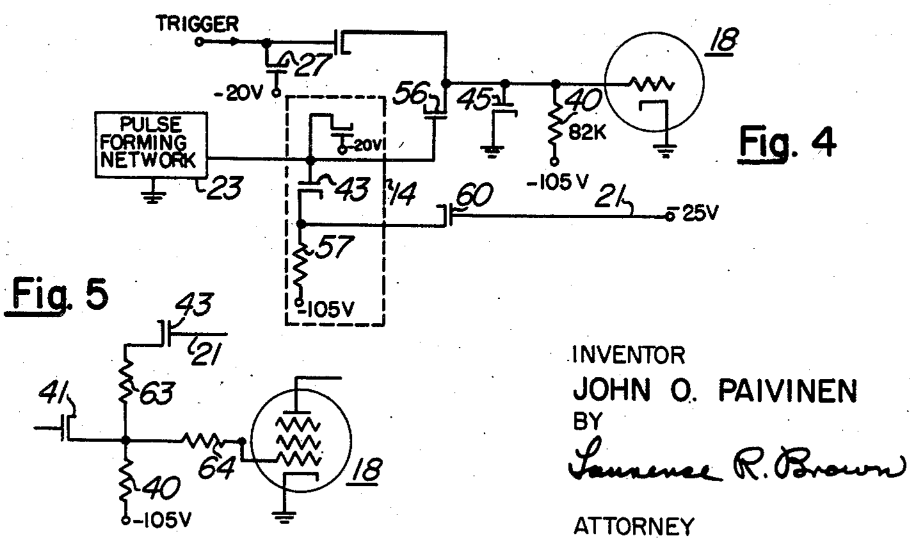
Fig. 4 is a combined block and schematic circuit diagram illustrating further features of the invention.
Fig. 5 is a segment of a circuit diagram illustrating further modifications of the invention.

Should the pulse forming network undesirably load the amplifier 18, an alternative arrangement for maintaining high input impedance as illustrated in Fig. 4 may be used. In this particular arrangement a diode 56 is provided for decoupling the pulse forming network 23 from the grid circuit of the amplifier 18 during the time that amplifier 18 is maintained at cutoff. Accordingly, the −105 volt source bias current through high impedance resistor 40 is only enough to maintain the clamping diode 45 in conduction and establish the clamping potential. During this period a separate current is flowing in the pulse forming network 23 from the −105 volt source by way of the low impedance resistor 57. The diode 56 serves to decouple the network, thereby reducing the loading effect on the amplifier.

When the tube conduction is initiated by an input trigger pulse, however, the anode of diode 56 becomes positive thereby causing conduction which couples the network 23 into the amplifier grid circuit. Lockout potential is fed by lead 21 to block diode 43 which in turn causes diode 56 to conduct by way of resistor 40 through the pulse forming network 23 throughout the pulse length, thereby causing the amplifier to conduct responsive to the newly formed pulse from network 23. An additional diode 60 is inserted in the circuit in this instance as a decoupling element between the −20 volt clamping potential at the pulse forming network and the −25 volt potential on the lockout lead 21.

Should it be desirable to obtain an output pulse having a positive excursion above ground potential a current limiting resistor 63 may be inserted in the feedback lead to establish a potential difference between the grid and output circuit as shown in Fig. 5. Any operation of input pulses above ground also would be possible with a resistor 64 connected in the grid circuit. This latter resistor could be used alone for both purposes when the output and input excursions above ground are of the same magnitude.

It is accordingly clear from the foregonig description of the invention and its mode of operation that standardized output potential pulse waveforms may be provided entirely independent of the duration or waveshape of input trigger pulses. The apparatus in operation is responsive to trigger pulses of random length and amplitude to provide standardized output pulses from a normally non-conducting amplifier tube, thereby effecting high circuit efficiency. Having therefore described the invention and its mode of construction, those features of novelty believed descriptive of the nature of the invention are defined with particularity in the appended claims.

What is claimed is:

1. A pulse standardizer circuit comprising, an input trigger pulse circuit, a clamping circuit for establishing a fixed amplitude trigger from said circuit, an amplifier stage, a unilateral conductor connected in the input circuit of said amplifier stage, potential supply means coupled to establish a fixed potential to a first side of said unilateral conductor in the absence of a trigger pulse, an impedance network connected to the other side of said unilateral conductor for conducting current from said potential supply means through said unilateral conductor in the absence of a trigger pulse to keep said amplifier stage non-conductive, whereby a trigger pulse cuts off said unilateral conductor to thereby cause said amplifier to conduct.

2. A circuit as defined in claim 1 wherein a potential clamping circuit is connected to the unilateral conductor to provide a constant maximum amplitude output signal upon conduction.

3. A circuit as defined in claim 1 wherein a lockout circuit is connected from said amplifier stage to said unilateral conductor to maintain diode cutoff after the expiration of the trigger pulse.

4. A circuit as defined in claim 1 wherein a potential source is connected by said impedance network to the amplifier side of said unilateral conductor of such amplitude that the unilateral conductor is retained in a non-conductive condition for a predetermined time interval determined by the parameters of said impedance network even in the presence of a trigger pulse of longer duration than said time interval.

5. A circuit as defined in claim 1 wherein a unilateral conductor couples said impedance network to said amplifier in such polarity that the input circuit of the amplifier is maintained at high impedance in the presence of a trigger pulse.

References Cited in the file of this patent

UNITED STATES PATENTS

| | | |
|---|---|---|
| 2,141,343 | Campbell | Dec. 27, 1938 |
| 2,406,019 | Labin | Aug. 20, 1946 |
| 2,430,457 | Dimond | Nov. 11, 1947 |
| 2,468,058 | Grieg | Apr. 26, 1949 |
| 2,489,297 | Labin et al. | Nov. 29, 1949 |
| 2,577,762 | Hoeppner et al. | Dec. 11, 1951 |
| 2,591,406 | Carter et al. | Apr. 1, 1954 |
| 2,685,049 | Steinberg | July 27, 1954 |
| 2,712,065 | Elbourn et al. | June 28, 1955 |